United States Patent [19]

Kolodziej

[11] Patent Number: 5,667,704
[45] Date of Patent: Sep. 16, 1997

[54] MULTIPLE SEQUENCE WELDING CONTROLLER

[75] Inventor: Edward R. Kolodziej, Farmington Hills, Mich.

[73] Assignee: Robotron, Southfield, Mich.

[21] Appl. No.: 627,781

[22] Filed: Apr. 1, 1996

Related U.S. Application Data

[60] Provisional application No. 60/011,954 Feb. 20, 1996.
[51] Int. Cl.⁶ .................................................. B23K 11/24
[52] U.S. Cl. ................................................. 219/108
[58] Field of Search ........................... 219/108, 110

[56] References Cited

U.S. PATENT DOCUMENTS

| | | | |
|---|---|---|---|
| 4,937,419 | 6/1990 | Kolodziej et al. | 219/110 |
| 5,072,090 | 12/1991 | Morita | 219/108 |
| 5,166,491 | 11/1992 | Izume et al. | 219/110 |
| 5,560,842 | 10/1996 | Kitaguchi et al. | 219/108 |

*Primary Examiner*—Clifford C. Shaw
*Attorney, Agent, or Firm*—Howard & Howard

[57] ABSTRACT

A three-phase multiple sequence welding controller includes a single unit controller having three distinct welding sequence control modules and three distinct machine logic control modules integrated into a single unit. The single unit controller preferably includes a single microprocessor, which incorporates the six distinct control modules. The single unit controller is preferably mounted with a plurality of input/output ports and control circuitry onto a single unit circuit board. The single unit controller is capable of controlling three welding machines along with a network of peripheral machines.

14 Claims, 2 Drawing Sheets

5,667,704

MULTIPLE SEQUENCE WELDING CONTROLLER

This application claims the benefits of priority under 35 USC §119 from the Provisional Application having Ser. No. 60/011,954, which was filed on Feb. 20, 1996.

BACKGROUND OF THE INVENTION

This invention generally relates to welding controllers and, more specifically, to a multiple sequence welding controller having the capability of controlling three separate welding machines and peripheral machinery.

A variety of welding controllers are currently in use. Most commercially available welding controllers include a welding sequence controller that is housed within a single box. A separate programming logic controller is typically housed in a separate box. These two boxes, along with other input/output interfaces, are typically mounted within a rack assembly. Such rack assemblies require hard wiring interconnections between the various boxes or, alternatively, require backplane connections between the distinct boxes.

Significant economical disadvantages are presented by such conventional systems. The amount of hard wiring required increases material costs. Moreover, specific designs must be generated for each individual application in order to ensure that the appropriate hard wiring connections are made. In addition to the economical disadvantages, performance is less than optimum when using a conventional rack-based system. The hard wiring or backplane connections introduce the potential for creating undesirable electrical noise and greatly reduce the speed of processing signals and signal propagation speed. Accordingly, those skilled in the art have attempted to improve the technology.

U.S. Pat. No. 4,937,419 represents one such advancement. That patent discusses a programmable welding controller that incorporates a weld machine controller and a peripheral machine controller into a single unit. There are at least two commercially available devices that incorporate a welding machine controller and a peripheral machine controller into a single unit. One such device is essentially a rack-mounted system, which therefore includes a plurality of hard wiring connections. Accordingly, this system includes some of the drawbacks discussed above.

Another system that is commercially available includes a single welding controller and peripheral machine controller mounted on a single printed circuit board. While this device avoids some of the hard wiring and mechanical connection drawbacks discussed above, it is desirable to provide a controller that has the capability of controlling a plurality of welding machines. The current state of the art is only capable of controlling one welding machine per controller unit.

This invention provides a single unit welding controller that is capable of controlling three separate welding machines. The controller designed according to this invention also has the capability of controlling peripheral machinery. Significant cost savings are provided by a system designed according to this invention along with greatly enhanced performance due to the elimination of signal noise and greatly enhanced signal processing speed.

SUMMARY OF THE INVENTION

In general terms, this invention is a machine control system for controlling a welding machine and a plurality of peripheral machines. The control system includes a single unit controller having three welding sequence control modules for controlling a welding operation. The controller also has three machine logic control modules for controlling machine programming, which can be used to control a plurality of peripheral machines. The single unit controller also controls current supply to the welding machine. A plurality of input/output ports and circuitry are provided for coupling the controller to the welding machines and a plurality of peripheral machines. A single board supports the controller and the input/output ports and circuitry such that the three machine logic control modules and the three welding sequence control modules are coupled for direct intercommunication through the firmware located on the single board.

In the preferred embodiment, the controller is a single unit microprocessor. The three welding sequence control modules and the three machine logic control modules are all located within the single unit microprocessor. All six modules have access to the same memory map within the microprocessor such that the controller is capable of accessing and utilizing any one of the six modules at any given time to perform a required operation. Intercommunication between the modules is greatly enhanced due to the incorporation of all of them within a single unit microprocessor.

DETAILED DESCRIPTION OF THE PREFERRED EMBODIMENT

Figure 1:
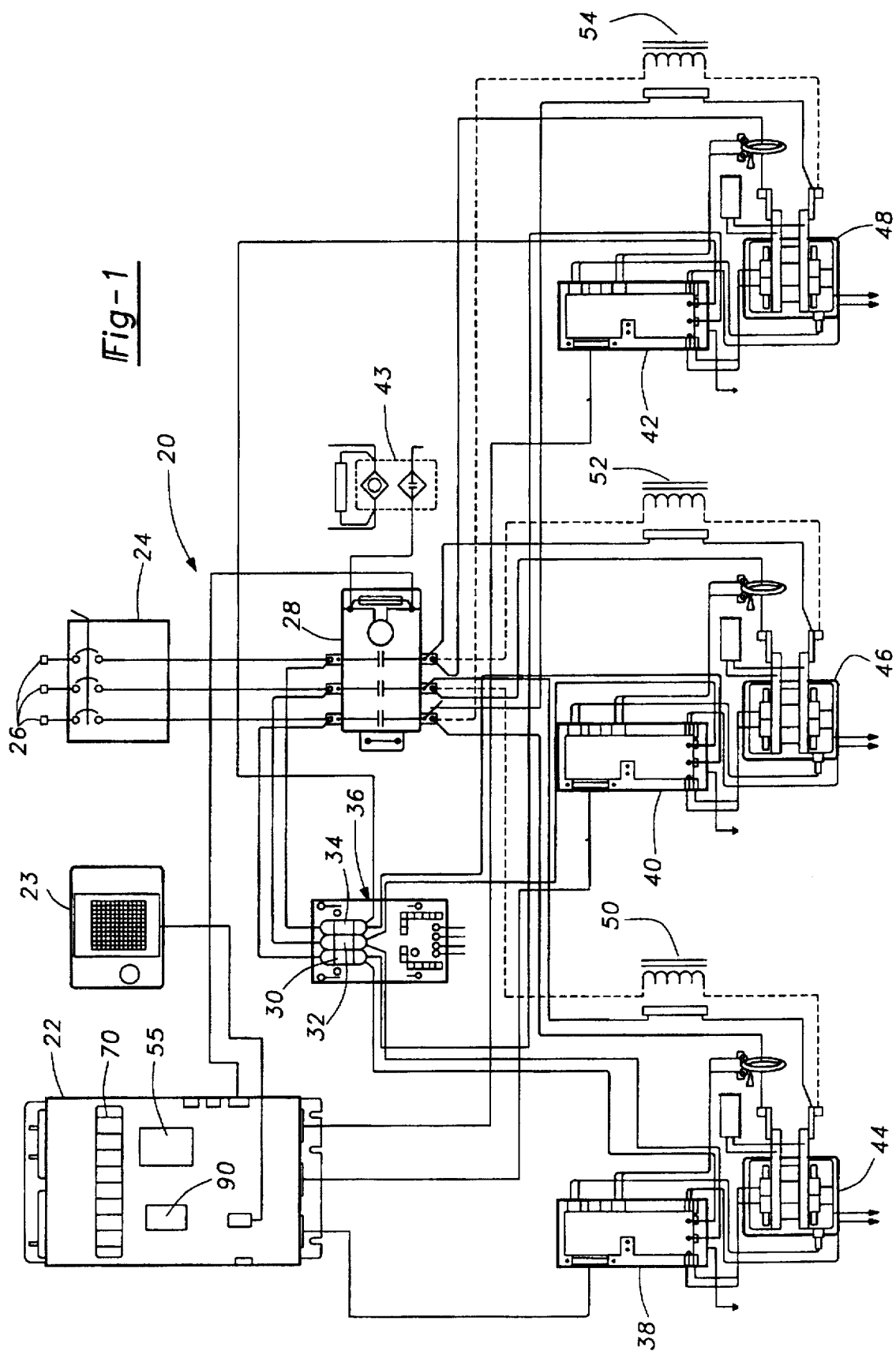
FIG. 1 is a schematic diagram illustrating a three-phase welding controller system.

FIG. 1 schematically illustrates a three-phase welding controller system 20. A single-unit controller 22 is provided on a single printed circuit board for controlling the operations of the remainder of the system. The details of the individual portions of the controller 22 will be described below. The controller 22 is a multiple sequence controller that is used as the central processing unit in the welding controller system. The illustrated system is preferably used for resistance welding operations. A data entry panel 23 permits a user to program the controller 22 and to control the operation of the system 20.

Conventional three-phase, alternating current, power supply is connected to a circuit breaker 24 through the three-phase power supply lines 26. The circuit breaker 24 is coupled to a three-phase mechanical contactor 28. The mechanical contactor 28 has contact switches that are normally open. The contact switches of the mechanical contactor 28 close only when a coil within the mechanical contactor 28 is energized by the controller 22.

Three fuses 30, 32 and 34 are also connected to the input terminals of the mechanical contactor 28. The fuses 30, 32 and 34 are preferably located on top of a power transformer 36. The fuse 30 is connected at one end to the mechanical contactor 28. The other end of the fuse 30 is connected to a terminal of a first firing board 38, a terminal of a third firing board 42, and to a primary winding within the transformer 36. One end of the fuse 32 is connected directly to the mechanical contactor 28. The other end of the fuse 32 is connected to a terminal of the first firing board 38, a terminal of the second firing board 40, and to the primary winding of the transformer 36. The fuse 34 is likewise connected at one end to the mechanical contactor 28 and at the other end to a terminal of the second firing board 40 and a terminal of the third firing board 42.

The power transformer 36 preferably has a primary winding and secondary windings with at least three outputs. The primary winding of the transformer 36 is preferably connected to the fuses 30 and 32. The three outputs of the secondary windings of the power transformer 36 preferably include fused 120 VAC, unfused 120 VAC and fused 24 VAC. The power transformer 36 is also connected directly to the controller 22. The transformer 36 and the controller 22 are preferably connected by the fused 120 VAC, the fused 24 VAC, an AC common terminal and a grounding terminal.

The 120 VAC secondary output from the transformer 36 preferably is connected to a solid state relay 43. The solid state relay 43 is a normally open relay that is also connected to the mechanical contactor coil within mechanical contactor 28.

The three separate firing boards 38, 40 and 42 are connected directly to the controller 22. Each of the firing boards are connected to an SCR assembly. The first firing board 38 is connected to an SCR 44, the second firing board 40 is connected to an SCR 46, and the third firing board 42 is connected to an SCR 48. Each firing board is also connected to a dedicated current coil, over temp switches of the respective SCR assemblies, and gate and cathode wires from the respective SCR assemblies.

The SCR assemblies 44, 46 and 48 include a silicone controlled rectifier, a weld current coil, a load resistor, and a DVDT network. Such SCR assemblies are well known in the art. The SCR assembly 44 is connected to a weld transformer 50, which is also connected to the mechanical contactor 28. The SCR assembly 46 is connected to a weld transformer 52, which is also connected to the mechanical contactor 28. Similarly, the SCR assembly 48 is connected to a weld transformer 54, which is also connected to the mechanical contactor 28.

Figure 2:
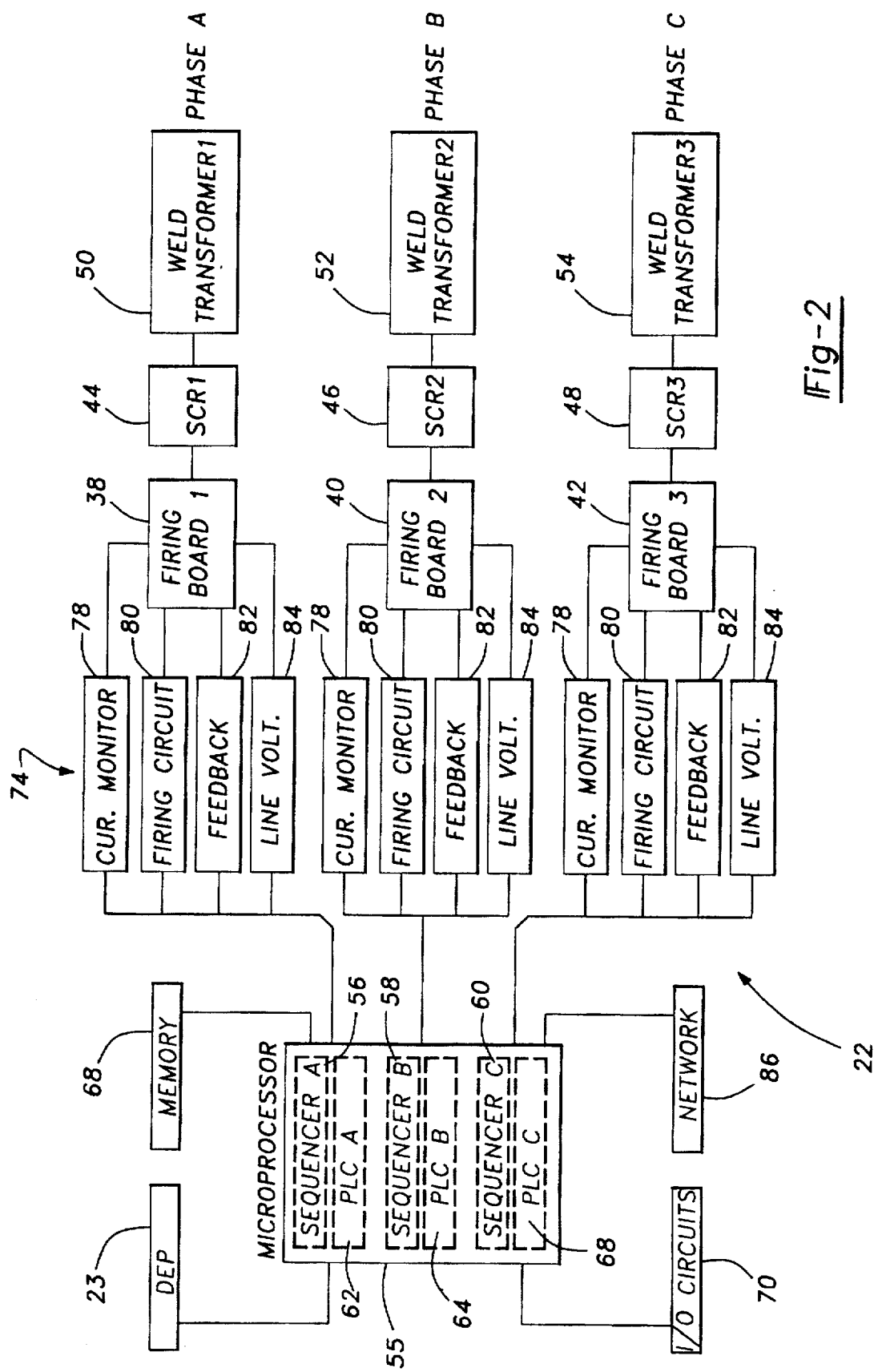
FIG. 2 is a block diagram illustrating a welding controller system designed according to this invention.

FIG. 2 illustrates, in block diagram form, the connections and communication between the various components of a welding controller system as illustrated in FIG. 1. The controller 22 includes a single unit microprocessor 55. In the presently preferred embodiment, the microprocessor 55 is an HC16 single unit microprocessor, which is commercially available from Motorola. The microprocessor 55 includes three separate welding sequence control modules 56, 58 and 60. Each of the welding sequence control modules preferably is capable of performing 900 programmable sequential logic steps. The logic steps are preferably divided into 15 sequences of 60 steps each. The specific welding sequences and their implementation will be understood by one skilled in the art and, therefore, will not be further described in this specification.

The single unit microprocessor 55 also includes three machine logic control modules 62, 64 and 66. The machine logic control modules are essentially individual programmable logic controllers or ladder logic controllers. The machine logic control modules are preferably random logic, one-bit scanning-type controllers. In the preferred embodiment, the maximum program size per module is 333 logic steps, which are scanned at a rate of approximately 100 instructions per line cycle, with a time of approximately 16.666 milliseconds. The controller 22 also includes a memory map 68. The memory map 68 preferably has three individual memory modules that each include 512 bits. The first 160 bits of each memory module are preferably used for real input/output, which may be user defined as input, output or used internally by the controller 22. Input/output bits are preferably assigned in groups of eight through slots to ports in input/output modules 70. The input/output circuitry between the microprocessor 55 and the input/output modules 70 is most preferably implemented through firmware on the single printed circuit board that supports all the components of the controller 22. 113 memory map bits are preferably sequencer status or control bits. Lastly, 231 memory map bits are preferably user defined internal status bits. Significantly, all of the memory map (i.e., all 512 bits of each memory module) may be examined, and most can be manipulated, by any one of the six modules 56–66 within the microprocessor 55. Significantly, the three welding sequence control modules and the three machine logic control modules directly communicate within the microprocessor 55 through the shared memory map 68. This provides significant advantages over the prior art where hard-wire or back plane connections were required in order to allow communication between various controllers. In a system designed according to this invention, signal noise is essentially eliminated and signal processing speed is drastically increased and improved.

Another significant advantage provided by the arrangement of six separate control modules within the microprocessor 55 is that any one of the control modules can be designated as a master control module. The remaining five modules then are designated as slave modules following the commands of the master control module. It is possible, in a system designed according to this invention, to have one of the control modules, sequence control module 56 for example, to be designated as a full-time master control module. Alternatively, the microprocessor 55 is programmable to determine which control module should be the master control module for any particular series of operations. In other words, the microprocessor 55 has the capability of being programmed to randomly select one of the six control modules to be the master control module at any particular time.

The microprocessor 55 is also connected to welding controller circuitry 74, which is most preferably within the firmware on the single unit circuit board. The illustrated system includes three welding machines that are operated through the first, second and third firing boards along with their associated SCR assemblies and welding transformers. Each of the three welding machines has a dedicated current monitor circuitry 78, firing circuitry 80, feedback circuitry 82 and line voltage monitoring circuitry 84. In the preferred embodiment, each welding firing board has a dedicated set of circuitry 78 through 84. The details of such circuitry will be understood by one skilled in the art and, therefore, need not be further described in this specification. It is possible to dedicate one of the welding sequence control modules to each set of circuitry 78 through 84. Alternatively, and most preferably, the microprocessor 55 is programmed to randomly and alternately cause the various welding sequence control modules and machine logic control modules to interface and communicate with each set of circuitry 78 through 84. All the circuitry 74 is most preferably accomplished within firmware on the single printed circuit board supporting all the elements of the controller 22. Incorporating all this circuitry onto a single board greatly enhances the speed and accuracy of system performance. Importantly, communication between the firmware circuitry and the six individual control modules within controller 22 is effectively instantaneous. Further, the likelihood of experiencing signal noise is essentially eliminated.

Microprocessor 55 is also connected to and capable of controlling a network of other peripheral machines 56. The peripheral network 86 is most preferably controlled through the machine logic control modules 62, 64 and 66. Returning to FIG. 1, the controller 22 is illustrated having the microprocessor 55, a series of input/output ports 70 and a remote input/output interface 90 all mounted on a single printed circuit board. The network 86 is preferably coupled to the controller 22 by the remote interface 90.

Including three welding sequence control modules 56, 58 and 60, and three machine logic control modules 62, 64 and 66, takes advantage of the conventional three-phase AC power that is supplied to the welding controller system. This provides significant advantages. All three phases of the power are utilized to control three separate welding machines. Additionally, the external components used for each of the welding machines can be three-phase components, which presents significant savings in materials and system design. As illustrated, the three-phase arrangement of this invention provides the ability to use a single three-phase circuit breaker 24, a single three-phase mechanical contactor 28, and a single three-phase transformer 36. In the prior art, three separate transformers, contactors and circuit breakers were required for all welding sequence controllers that were incorporated into a system.

Given the foregoing discussion, one skilled in the art is capable of developing the software and programming for the controller 22 and configuring a specific arrangement of the above-discussed firmware circuitry and the input/output ports on a single primed circuit board. Therefore, further details need not be given in this specification.

The foregoing description is exemplary rather than limiting in nature. Variations and modifications are possible that do not depart from the purview and spirit of this invention. The scope of the invention is, therefore, to be limited only by the appended claims.

What is claimed is:

1. A machine control system for controlling a welding machine and a plurality of peripheral machines, comprising:

a controller having three welding sequence control modules for controlling a welding operation, and three machine logic control modules for controlling machine programming, said controller also controlling current supply to the welding machine;

a plurality of input/output ports for coupling said controller to a plurality of machines; and a single board supporting said controller and said input/output ports such that said three machine logic control modules and said three welding sequence control modules are coupled for direct intercommunication through said board.

2. The system of claim 1, wherein said controller comprises a single unit microprocessor.

3. The system of claim 1, wherein said input/output ports are coupled with said controller through firm ware circuitry located on said single board.

4. The system of claim 1, wherein said three welding sequence control modules and said machine logic control modules each include an operation communication link that couples each said module to the other of said modules and wherein one of said modules controls the operation of the other of said modules.

5. The system of claim 4, wherein at least one of said operation communication links is configured to provide one-way communication such that one of said control modules always controls the other of said modules.

6. The system of claim 4, wherein said controller includes a designator module that designates one of said control modules to control the other of said control modules according to an operation condition of said controller, the welding machine and said plurality of peripheral machines.

7. The system of claim 1, including three welding machines and wherein one of said three welding sequence control modules is dedicated to each welding machine, respectively.

8. The system of claim 1, wherein said controller further includes a random access memory map and wherein said three welding sequence control modules and said three machine logic control modules each access said memory map.

9. The system of claim 8, wherein said single board is a printed circuit board including input/output circuitry coupling said controller and said input/output ports, current control circuitry for controlling the supply of current to said welding machines, and a remote input/output port for coupling said controller to a plurality of peripheral machines.

10. A welding system, comprising:

three welding machines;

a circuit board;

a controller mounted on said circuit board, said controller having three welding sequence control modules for controlling said welding machines and three machine logic control modules for controlling machine programming and operation of said welding machines;

current control circuitry, mounted on said circuit board, for coupling said controller to said welding machines for controlling a supply of current to said welding machines;

a plurality of input/output ports mounted on said circuit board for interconnecting said controller and said welding machines; and a three-phase mechanical switch coupled to said controller such that said controller selectively applies three-phase power to said welding machines and wherein one phase of said power is applied to each of said welding machines, respectively.

11. The system of claim 10, wherein said controller comprises a single unit microprocessor and wherein said controller includes a random access memory map and wherein each of said three welding sequence control modules and each of said machine logic control modules accesses said memory map.

12. The system of claim 11, wherein said welding sequence control modules and said machine logic control modules each include an operation communication link that couples each of said modules to the other of said modules and wherein one of said modules controls the other of said modules.

13. The system of claim 12, wherein said controller includes a designation module that randomly selects one of said control modules to control the other of said modules responsive to a current state of a welding operation.

14. The system of claim 10, wherein each said welding sequence control module has a preselected set of said input/output ports that is coupled to a selected one of said welding machines, respectively, such that each said welding sequence control module is assigned to one of said welding machines, respectively.

* * * * *